United States Patent
Terwilliger et al.

(10) Patent No.: US 11,725,544 B1
(45) Date of Patent: Aug. 15, 2023

(54) HYDROGEN-OXYGEN FUELED POWERPLANT WITH WATER AND HEAT RECOVERY

(71) Applicant: Raytheon Technologies Corporation, Farmington, CT (US)

(72) Inventors: Neil J. Terwilliger, Cheshire, CT (US); Walter A. Ledwith, Jr., Marlborough, CT (US); Joseph B. Staubach, Colchester, CT (US); David L. Ma, Avon, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 17/670,043

(22) Filed: Feb. 11, 2022

(51) Int. Cl.
| | | |
|---|---|---|
| F01K 25/00 | (2006.01) | |
| F01K 27/02 | (2006.01) | |
| F01K 15/02 | (2006.01) | |
| F01K 7/16 | (2006.01) | |
| F01K 7/12 | (2006.01) | |

(52) U.S. Cl.
CPC ............ *F01K 25/005* (2013.01); *F01K 7/12* (2013.01); *F01K 7/16* (2013.01); *F01K 15/02* (2013.01); *F01K 27/02* (2013.01)

(58) Field of Classification Search
CPC . F01K 25/005; F01K 7/12; F01K 7/16; F01K 15/02; F01K 27/02; F01K 23/10
See application file for complete search history.

(56) References Cited

U.S. PATENT DOCUMENTS

| | | | | |
|---|---|---|---|---|
| 3,844,262 A | * | 10/1974 | Dieges | F02B 43/10 123/567 |
| 5,014,508 A | | 5/1991 | Lifka | |
| 5,052,176 A | | 10/1991 | Labatut | |
| 5,644,911 A | * | 7/1997 | Huber | F01K 25/005 60/39.52 |
| 5,775,091 A | * | 7/1998 | Bannister | F01D 5/084 60/39.465 |
| 5,782,081 A | * | 7/1998 | Pak | F02C 3/34 60/39.181 |

(Continued)

FOREIGN PATENT DOCUMENTS

| | | |
|---|---|---|
| EP | 3048281 B1 | 4/2017 |
| GB | 870268 A | 6/1961 |

(Continued)

*Primary Examiner* — Jesse S Bogue
(74) *Attorney, Agent, or Firm* — Getz Balich LLC

(57) ABSTRACT

A powerplant is provided that includes an engine and a water recovery system. The engine includes an engine combustor, an engine turbine, a flowpath and a fluid delivery system. The flowpath extends out of the engine combustor and through the engine turbine. The fluid delivery system includes a hydrogen reservoir and an oxygen reservoir. The hydrogen reservoir is configured to store fluid hydrogen as liquid hydrogen. The oxygen reservoir is configured to store fluid oxygen as liquid oxygen. The fluid delivery system is configured to provide the fluid hydrogen and the fluid oxygen for combustion within the engine combustor to produce combustion products within the flowpath. The water recovery system is configured to extract water from the combustion products. The water recovery system is configured to provide the water to a component of the powerplant.

17 Claims, 6 Drawing Sheets

(56) References Cited

U.S. PATENT DOCUMENTS

| | | | | | |
|---|---|---|---|---|---|
| 5,896,740 | A | * | 4/1999 | Shouman | F01K 21/042 60/39.55 |
| 5,953,900 | A | * | 9/1999 | Bannister | F01K 25/005 60/39.55 |
| 6,148,602 | A | * | 11/2000 | Demetri | F25J 3/04612 60/39.12 |
| 6,167,692 | B1 | * | 1/2001 | Anand | F02C 3/22 60/39.12 |
| 6,282,883 | B1 | * | 9/2001 | Uematsu | F01K 25/005 60/39.182 |
| 7,721,524 | B2 | | 5/2010 | Jahnsen | |
| 11,578,624 | B2 | * | 2/2023 | Copeland | F01K 23/065 |
| 2001/0023580 | A1 | * | 9/2001 | Sugishita | F01K 23/10 60/39.181 |
| 2004/0128975 | A1 | * | 7/2004 | Viteri | F02C 6/10 60/39.55 |
| 2012/0137698 | A1 | * | 6/2012 | Sjodin | F01K 23/10 60/774 |
| 2014/0150445 | A1 | * | 6/2014 | Huntington | F02C 7/228 60/776 |
| 2020/0263568 | A1 | * | 8/2020 | Copeland | F02C 6/04 |
| 2021/0001269 | A1 | * | 1/2021 | Klingels | F01D 25/32 |
| 2021/0131348 | A1 | * | 5/2021 | Uechi | F02C 7/224 |
| 2021/0207500 | A1 | * | 7/2021 | Klingels | F01K 23/10 |
| 2021/0285851 | A1 | | 9/2021 | Farouz-Fouquet | |

FOREIGN PATENT DOCUMENTS

| | | |
|---|---|---|
| GB | 2190964 A | 12/1987 |
| RU | 2561757 C1 | 9/2015 |

* cited by examiner

HYDROGEN-OXYGEN FUELED POWERPLANT WITH WATER AND HEAT RECOVERY

BACKGROUND OF THE DISCLOSURE

1. Technical Field

This disclosure relates generally to a powerplant and, more particularly, to a powerplant for use with liquid hydrogen and liquid oxygen.

2. Background Information

As government emissions standards tighten, interest in alternative fuels for gas turbine engines continues to grow. There is interest, for example, in fueling a gas turbine engine with hydrogen ($H_2$) rather than a traditional hydrocarbon fuel such as kerosine to reduce greenhouse emissions. Whiles various hydrogen fueled gas turbine engines are known in the art, there is still room in the art for improvement.

SUMMARY OF THE DISCLOSURE

According to an aspect of the present disclosure, a powerplant is provided that includes an engine and a water recovery system. The engine includes an engine combustor, an engine turbine, a flowpath and a fluid delivery system. The flowpath extends out of the engine combustor and through the engine turbine. The fluid delivery system includes a hydrogen reservoir and an oxygen reservoir. The hydrogen reservoir is configured to store fluid hydrogen as liquid hydrogen. The oxygen reservoir is configured to store fluid oxygen as liquid oxygen. The fluid delivery system is configured to provide the fluid hydrogen and the fluid oxygen for combustion within the engine combustor to produce combustion products within the flowpath. The water recovery system is configured to extract water from the combustion products. The water recovery system is configured to provide the water to a component of the powerplant.

According to another aspect of the present disclosure, another powerplant is provided that includes an engine. The engine includes an engine combustor, an engine turbine, a flowpath and a fluid delivery system. The flowpath extends out of the engine combustor and through the engine turbine. The fluid delivery system includes a hydrogen reservoir, an oxygen reservoir and a heat exchanger system. The fluid delivery system is configured to deliver fluid hydrogen and fluid oxygen for combustion within the engine combustor to produce combustion products within the flowpath. The hydrogen reservoir is configured to store the fluid hydrogen as liquid hydrogen. The oxygen reservoir is configured to store the fluid oxygen as liquid oxygen. The heat exchanger system is configured to transfer heat energy from the combustion products to: the fluid hydrogen as the fluid delivery system directs the fluid hydrogen towards the engine combustor; and/or the fluid oxygen as the fluid delivery system directs the fluid oxygen towards the engine combustor.

According to still another aspect of the present disclosure, a method is provided during which a powerplant for an aircraft is provided. The powerplant includes a mechanical load, an engine combustor, an engine turbine, a hydrogen reservoir, an oxygen reservoir and a water recovery system. Fluid hydrogen is directed from the hydrogen reservoir to the engine combustor. The fluid hydrogen is stored within the hydrogen reservoir as liquid hydrogen. Fluid oxygen is directed from the oxygen reservoir to the engine combustor. The fluid oxygen is stored within the oxygen reservoir as liquid oxygen. The fluid hydrogen is combusted with the fluid oxygen within the engine combustor to provide combustion products. The combustion products are directed through the engine turbine to rotatably drive the mechanical load. Water is extracted from the combustion products using the water recovery system. A component of the powerplant is cooled using at least some of the water.

The powerplant may also include a water recovery system. This water recovery system may be configured to extract water from the combustion products. The water recovery system may also be configured to provide the water to a component of the engine for cooling the component.

The engine combustor may be configured as or otherwise include the component.

The engine turbine may be configured as or otherwise include the component.

The water recovery system may be configured to provide at least some of the water to the component as water vapor.

The water recovery system may include a condenser arranged with the flowpath. The water recovery system may be configured to extract the water from the combustion products using the condenser. The water extracted from the combustion products may be or otherwise include liquid water.

The condenser may be configured as or otherwise include a condensing turbine.

The water recovery system may also include an evaporator arranged with the flowpath. The evaporator may be configured to vaporize at least some of the liquid water directed by the water recovery system towards the component.

The evaporator may be fluidly between the engine turbine and the condenser along the flowpath.

The water recovery system may also include a water pump fluidly coupled between the condenser and the evaporator.

The powerplant may also include a steam turbine fluidly coupled between the evaporator and the component.

The water recovery system may include a water reservoir for storing at least some of the water.

The fluid delivery system may be configured to: direct the fluid hydrogen to the engine combustor as the liquid hydrogen; and/or direct the fluid oxygen to the engine combustor as the liquid oxygen.

The fluid delivery system may also include a heat exchanger. The heat exchanger may be configured to transfer heat energy from the combustion products to the fluid hydrogen as the fluid delivery system directs the fluid hydrogen to the engine combustor.

The fluid delivery system may also include a turboexpander downstream of the heat exchanger. The heat exchanger may be configured to vaporize the fluid hydrogen to provide gaseous hydrogen. The turboexpander may be configured to expand the gaseous hydrogen and generate mechanical power.

The fluid delivery system may also include a heat exchanger. The heat exchanger may be configured to transfer heat energy from the combustion products to the fluid oxygen as the fluid delivery system directs the fluid oxygen to the engine combustor.

The fluid delivery system may also include a turboexpander downstream of the heat exchanger. The heat exchanger may be configured to vaporize the fluid oxygen to provide gaseous oxygen. The turboexpander may be configured to expand the gaseous oxygen and generate mechanical power.

The powerplant may also include a pre-burner arranged upstream of the engine combustor along the flowpath. The fluid delivery system may also be configured to provide the fluid hydrogen and the fluid oxygen for combustion within the pre-burner.

The powerplant may also include a second turbine arranged along the flowpath between the pre-burner and the engine combustor.

The powerplant may also include a propulsor rotor coupled to and rotatably driven by the engine turbine.

The powerplant may also include an electric generator. This electric generator may include a generator rotor coupled to and rotatably driven by the engine turbine.

The generator rotor may also or alternatively be coupled to and rotatably driven by the steam turbine and/or a turbogenerator.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
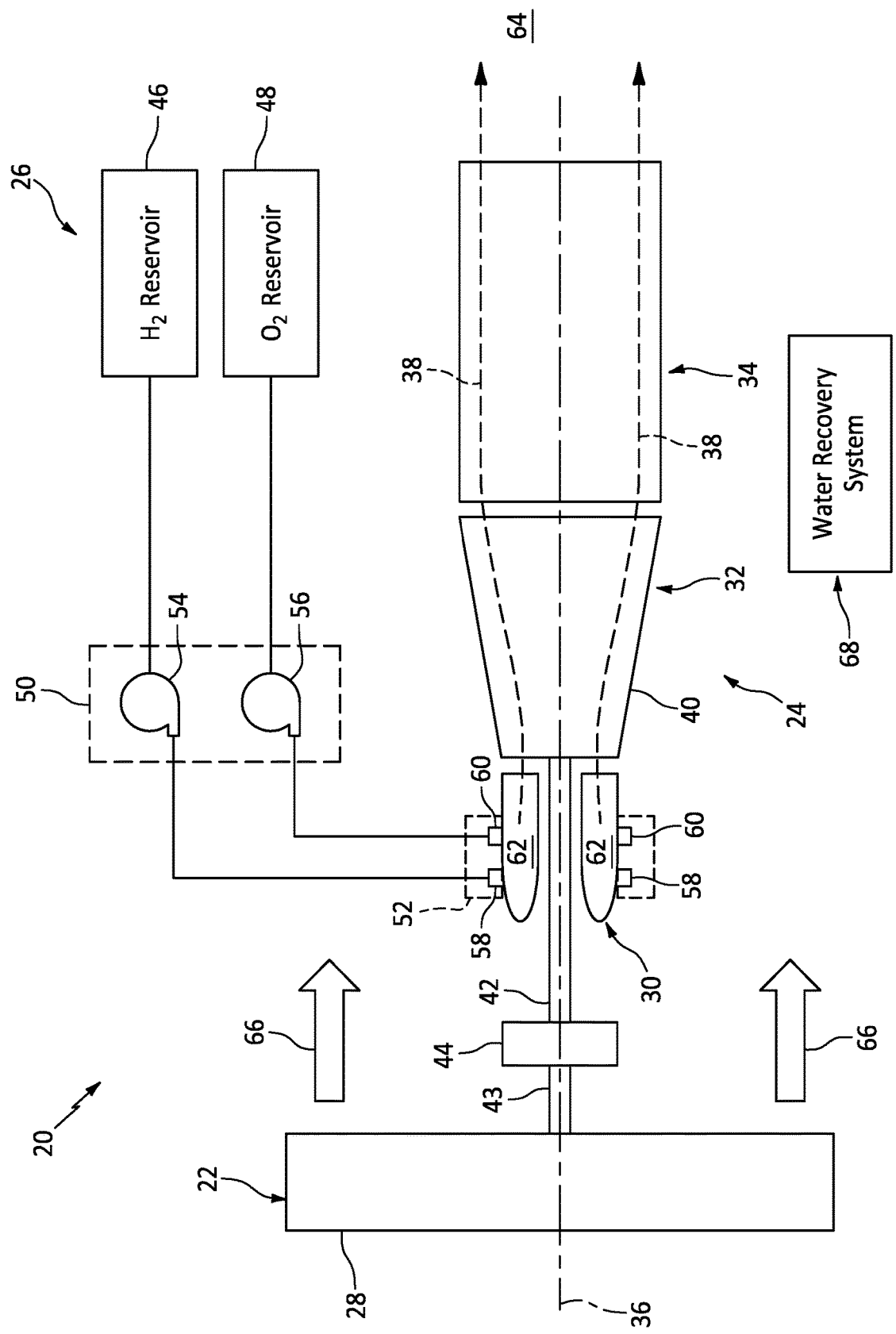
FIG. 1 is a schematic illustration of a powerplant for an aircraft.

FIG. 1 is a schematic illustration of a powerplant 20 for an aircraft such as, but not limited to, an airplane. This powerplant 20 may be configured as, or otherwise included as part of, a propulsion system for the aircraft. The powerplant 20 may also or alternatively be configured as, or otherwise included as part of, an electrical power system for the aircraft. The present disclosure, however, is not limited to aircraft applications. The powerplant 20, for example, may alternatively be configured as, or otherwise included as part of, a propulsion system and/or an electrical power system for another type of vehicle. The powerplant 20 may still alternatively be configured as, or otherwise included as part of, an industrial electrical power system.

The powerplant 20 may be configured as a non-hydrocarbon powerplant/a hydrocarbon free powerplant; e.g., a powerplant that does not use (or require) hydrocarbon fuel for powerplant operation such as, but not limited to, kerosine, jet fuel, etc. The powerplant 20 of FIG. 1, for example, is configured as a hydrogen-oxygen burning powerplant. More particularly, the powerplant 20 of FIG. 1 is configured as a hydrolox powerplant that burns liquid hydrogen with liquid oxygen, as opposed to other hydrogen burning powerplants which burn hydrogen with air taken from outside of the powerplant 20. Combusting the hydrogen with the oxygen within the hydrolox powerplant may eliminate nitrous oxide emissions, whereas nitrous oxide emissions are present when combusting hydrogen with compressed air, for example.

The powerplant 20 includes a mechanical load 22 and a powerplant engine 24 for rotatably driving the mechanical load 22. The powerplant 20 also includes a powerplant fluid delivery system 26 (e.g., a propellant system, a hydrogen-oxygen system, etc.) for servicing (e.g., providing propellant to, etc.) the engine 24.

The mechanical load 22 may be configured as or otherwise include at least one driven rotor 28. The mechanical load 22, for example, may be configured as a bladed propulsor rotor for the aircraft propulsion system. Examples of the propulsor rotor include, but are not limited to, a propeller for a propeller engine (e.g., a turboprop engine), a fan for a ducted fan engine (e.g., a turbofan engine), and an open rotor for an open rotor engine (e.g., a pusher fan engine, an open tractor rotor engine, etc.). The mechanical load 22 may also or alternatively be configured as a generator rotor in an electrical power generator for the power system. The present disclosure, however, is not limited to the foregoing exemplary mechanical loads nor the foregoing exemplary powerplant configurations.

The engine 24 includes an engine combustor 30, an engine power turbine 32 (e.g., a free turbine) and an engine exhaust 34. The combustor 30, the power turbine 32 and the exhaust 34 of FIG. 1 may be arranged sequentially along an axial centerline 36 of the engine 24, which axial centerline 36 may also be a rotational axis for the power turbine 32 as well as the mechanical load 22 in FIG. 1. The engine 24 of FIG. 1 also includes a (e.g., annular) core flowpath 38. This core flowpath 38 may start at/within the combustor 30, and projects out of the combustor 30 and sequentially through the power turbine 32 and the exhaust 34. The core flowpath 38 thereby fluidly couples the power turbine 32 with the combustor 30 and the exhaust 34, where the power turbine 32 is downstream of the combustor 30 along the core flowpath 38, and where the exhaust 34 is downstream of the power turbine 32 along the core flowpath 38.

The power turbine 32 includes a bladed power turbine rotor 40 with one or more stages along the axial centerline 36. The power turbine rotor 40 is connected to the driven rotor 28 through a drivetrain. The drivetrain of FIG. 1 includes an engine shaft 42, a load shaft 43 and a geartrain 44; e.g., an epicyclic geartrain. The engine shaft 42 connects the power turbine rotor 40 to the geartrain 44. The load shaft 43 connects the geartrain 44 to the driven rotor 28. The power turbine rotor 40 may thereby rotatably drive the driven rotor 28 through the drivetrain and its elements 42-44. The geartrain 44 may be configured as a speed reduction device such that, for example, a rotational speed of the power turbine rotor 40 and its engine shaft 42 may be different (e.g., greater or less) than a rotational speed of the driven rotor 28 and its load shaft 43. Of course, in other embodiments, the geartrain 44 may be omitted and the power turbine rotor 40 may directly drive the driven rotor 28.

The fluid delivery system 26 of FIG. 1 includes a hydrogen reservoir 46, an oxygen reservoir 48, a pump system 50 and an injection system 52. The hydrogen reservoir 46 is configured to store (e.g., contain and hold) a quantity of fluid hydrogen; e.g., fuel. Within the hydrogen reservoir 46, the fluid hydrogen may be in a form of entirely (e.g., only) or substantially (e.g., at least 95%) liquid hydrogen; e.g., when the hydrogen reservoir 46 is substantially full. The hydrogen reservoir 46 may be configured as or otherwise include a container; e.g., a tank, a cylinder, a pressure vessel, a bladder, etc. The hydrogen reservoir 46 includes an outlet.

The oxygen reservoir 48 is configured to store (e.g., contain and hold) a quantity of fluid oxygen (e.g., $O_2$); e.g., oxidizer. Within the oxygen reservoir 48, the fluid oxygen may be in a form of entirely (e.g., only) or substantially (e.g., at least 95%) liquid oxygen; e.g., when the oxygen reservoir 48 is substantially full. The oxygen reservoir 48 may be configured as or otherwise include a container; e.g., a tank, a cylinder, a pressure vessel, a bladder, etc. The oxygen reservoir 48 includes an outlet.

The pump system 50 includes one or more pumps 54 and 56. One or more of these pumps 54 and/or 56 may be configured as or otherwise include a mechanical pump such as, but not limited to, a turbopump. One or more of the pumps 54 and/or 56 may also or alternatively be configured as or otherwise include an electrical pump.

The hydrogen pump 54 is fluidly coupled between the hydrogen reservoir 46 and the combustor 30 and, more particularly, the injection system 52. An inlet to the hydrogen pump 54, for example, is fluidly coupled with and downstream of from the hydrogen reservoir outlet. An outlet from the hydrogen pump 54 is fluidly coupled with and upstream of a hydrogen inlet to the injection system 52. The hydrogen pump 54 is configured to draw the fluid hydrogen out of the hydrogen reservoir 46 through its hydrogen pump inlet, pressurize the fluid hydrogen within the hydrogen pump 54, and direct the pressurized fluid hydrogen to the combustor 30 via the injection system 52; e.g., through one or more fluid hydrogen injectors 58. The fluid hydrogen directed out of the hydrogen pump 54 may remain in the form of entirely (e.g., only) or substantially (e.g., at least 95%) liquid hydrogen, where this liquid hydrogen is provided to the fluid hydrogen injectors 58.

The oxygen pump 56 is fluidly coupled between the oxygen reservoir 48 and the combustor 30 and, more particularly, the injection system 52. An inlet to the oxygen pump 56, for example, is fluidly coupled with and downstream of the oxygen reservoir outlet. An outlet from the oxygen pump 56 is fluidly coupled with and upstream of an oxygen inlet to the injection system 52. The oxygen pump 56 is configured to draw the fluid oxygen out of the oxygen reservoir 48 through its oxygen pump inlet, pressurize the fluid oxygen within the oxygen pump 56, and direct the pressurized fluid oxygen to the combustor 30 via the injection system 52; e.g., through one or more fluid oxygen injectors 60. The fluid oxygen directed out of the oxygen pump 56 may remain in the form of entirely (e.g., only) or substantially (e.g., at least 95%) liquid oxygen, where this liquid oxygen is provided to the fluid oxygen injectors 60.

During operation of the powerplant 20 of FIG. 1, the pump system 50 directs pressurized fluid hydrogen and pressurized fluid oxygen to the injection system 52. The injection system 52 injects the pressurized fluid hydrogen and the pressurized fluid oxygen into a (e.g., annular) combustion chamber 62 of the combustor 30. The injected hydrogen and the injected oxygen provide a hydrogen-oxygen mixture which is ignited within the combustion chamber 62 to produce combustion products within the combustion chamber 62/the core flowpath 38. These combustion products may be water ($H_2O$) vapor. Alternatively, the combustion products may include a combination of water vapor with gaseous oxygen ($O_2$) and/or gaseous hydrogen ($H_2$) where, for example, the injected hydrogen and/or the injected oxygen is only partially combusted.

The combustion products flow along the core flowpath 38 out of the combustor 30 and through the power turbine 32 causing the power turbine rotor 40 to rotate. The combustion products are subsequently exhausted from the powerplant 20 and its engine 24 through the exhaust 34 into an external environment 64 (e.g., an ambient environment outside of and around the powerplant 20/the aircraft), which exhausted combustion products may provide powerplant thrust. The rotation of the power turbine rotor 40 drives rotation of the mechanical load 22 and its driven rotor 28. Where the driven rotor 28 is configured as the propulsor rotor, the rotation of the driven rotor 28 may propel another airflow 66 (e.g., a bypass airflow) along and/or external to the powerplant 20 and its engine 24 to provide additional powerplant thrust. Where the driven rotor 28 is configured as the generator rotor, the rotation of the driven rotor 28 may facilitate generation of electricity by the electrical power generator.

The combustion of the fluid hydrogen with the fluid oxygen within the combustor 30 may produce the combustion products with relatively high temperatures and relatively high pressures. While the relatively high combustion product pressures may facilitate an increase in powerplant power and/or powerplant efficiency, the relatively high combustion product temperatures may subject one or more components of the engine 24 along the core flowpath 38 to relatively high thermal stresses and/or thermal degradation. Furthermore, exhausting combustion products with relatively high temperatures wastes heat energy. Therefore, to provide engine component cooling and/or waste heat recovery, the powerplant 20 is configured with/further includes a water recovery system 68.

Figure 2:
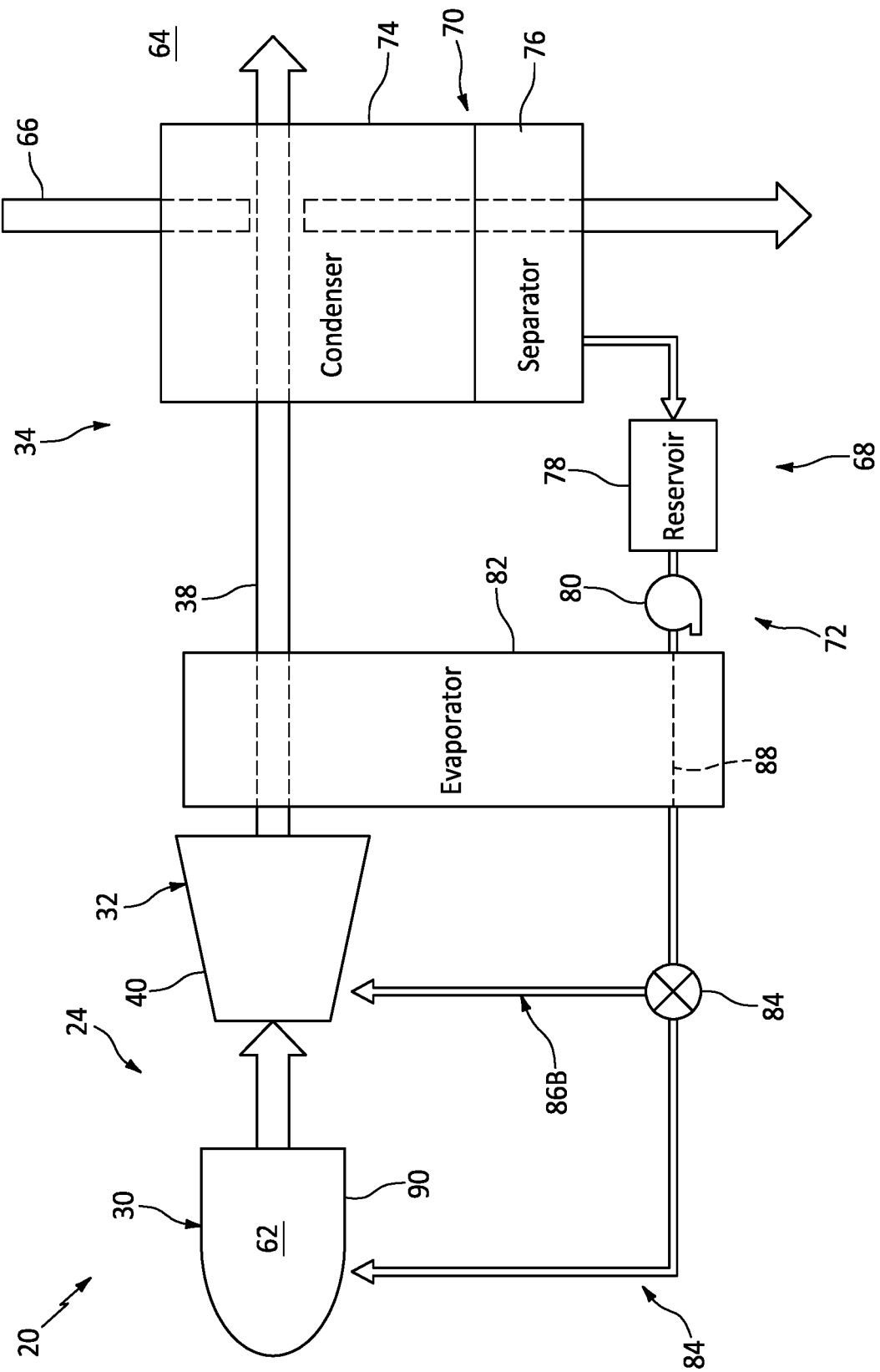
FIG. 2 is a schematic illustration of a portion of a powerplant engine system configured with a water recovery system.

Referring to FIG. 2, the water recovery system 68 includes a water extraction system 70 configured to extract the water from the combustion products. The water recovery system 68 includes a water processing system 72 configured to receive and collect and/or otherwise process the water extracted by the water extraction system 70.

The water extraction system 70 includes a water extraction system (WES) condenser 74 and a water extraction system (WES) water separator 76. The condenser 74 is arranged with (e.g., within) the core flowpath 38 downstream of the combustor 30 and the power turbine 32; e.g., within the exhaust 34. The condenser 74 is configured to condense the water vapor within the combustion products into liquid water. For example, as the combustion products flow through and/or about the condenser 74, the condenser 74 may transfer heat energy from the relatively warm combustion products into a relatively cool fluid; e.g., the bypass airflow (e.g., 66), ambient air in the environment 64 outside of the powerplant 20, fuel, lubricant, hydraulic fluid, etc. This transfer of the heat energy out of the combustion products cools the combustion products such that at least some (or all) of the water in the combustion products change phase from gas to liquid. Following this phase change, the separator 76 at least partially or completely separates the liquid water from the rest of the gaseous combustion products. Various types and configurations of liquid-gas water separators are known in the art, and the present disclosure is not limited to any particular ones thereof.

The water processing system 72 of FIG. 2 includes a water processing system (WES) water reservoir 78, a water processing system (WES) water pump 80, a water processing system (WES) evaporator 82 and a water processing system (WES) valve 84. The water processing system 72 of FIG. 2 also includes one or more water processing system (WES) water flow circuits 86A and 86B (generally referred to as 86); however, in other embodiments, either one of the flow circuits 86A or 86B may be omitted and/or one or more additional water flow circuits may be included.

The water reservoir 78 is fluidly coupled with and downstream of the water extraction system 70 and its separator 76. An inlet to the water reservoir 78, for example, is fluidly coupled with an outlet from the water extraction system 70; e.g., an outlet from the separator 76. The water reservoir 78 is configured to at least temporarily store (e.g., contain and hold) at least some or all of the water extracted from the combustion products; e.g., the water received from the water extraction system 70. The water reservoir 78, for example, may be configured as or otherwise include a container such as, but not limited to, a tank, a cylinder, a pressure vessel and/or a bladder.

The water pump 80 is fluidly coupled with and downstream of the water reservoir 78. An inlet to the water pump 80, for example, is fluidly coupled with an outlet from the water reservoir 78. The water pump 80 is configured to pressurize liquid water received from the water reservoir 78.

The evaporator 82 is arranged with (e.g., within) the core flowpath 38 downstream of the combustor 30 and the power turbine 32; e.g., within the exhaust 34. The evaporator 82 of FIG. 2 is also arranged between the power turbine 32 and the condenser 74 along the core flowpath 38. The evaporator 82 is fluidly coupled with and downstream of the water pump 80. An inlet to a water circuit 88 of the evaporator 82, for example, is fluidly coupled with an outlet from the water pump 80. The evaporator 82 is configured to vaporize at least some (or all) of the pressurized liquid water received from the water pump 80 into water vapor. For example, as the pressurized liquid water flows through the evaporator 82 and its water circuit 88, the evaporator 82 may transfer heat energy from the relatively warm combustion products into the relatively cool liquid water. This transfer of the heat energy into the liquid water heats the liquid water such that at least some (or all) of the liquid water received from the water reservoir 78 through the water pump 80 changes phase from liquid to gas. The transfer of the heat energy also recovers at least some of the heat energy that would otherwise be exhausted with the combustion products through the exhaust 34.

The flow circuits 86A and 86B are fluidly coupled (e.g., in parallel) with and downstream of the evaporator 82. An inlet to the (e.g., combustor) flow circuit 86A and an inlet to the (e.g., turbine) flow circuit 86B, for example, may be fluidly coupled (e.g., in parallel) with an outlet from the water circuit 88 of the evaporator 82 through the valve 84. The flow circuit 86A is fluidly coupled with and upstream of at least one component of the powerplant 20/the engine 24. An outlet from the flow circuit 86A, for example, may be fluidly coupled with a (e.g., cooling) circuit inlet to the combustor 30. The flow circuit 86B is fluidly coupled with and upstream of at least one another component of the powerplant 20/the engine 24. An outlet from the flow circuit 86B, for example, may be fluidly coupled with a (e.g., cooling) circuit inlet to the power turbine 32.

The flow circuit 86A is configured to direct (e.g., flow) the water vapor received from the evaporator 82 through the valve 84 to the combustor circuit inlet. At the combustor 30, the water vapor may be directed into a cooling circuit in a wall 90 of the combustor 30 for cooling the combustor wall 90 and/or injected into the combustion chamber 62.

Figure 3:
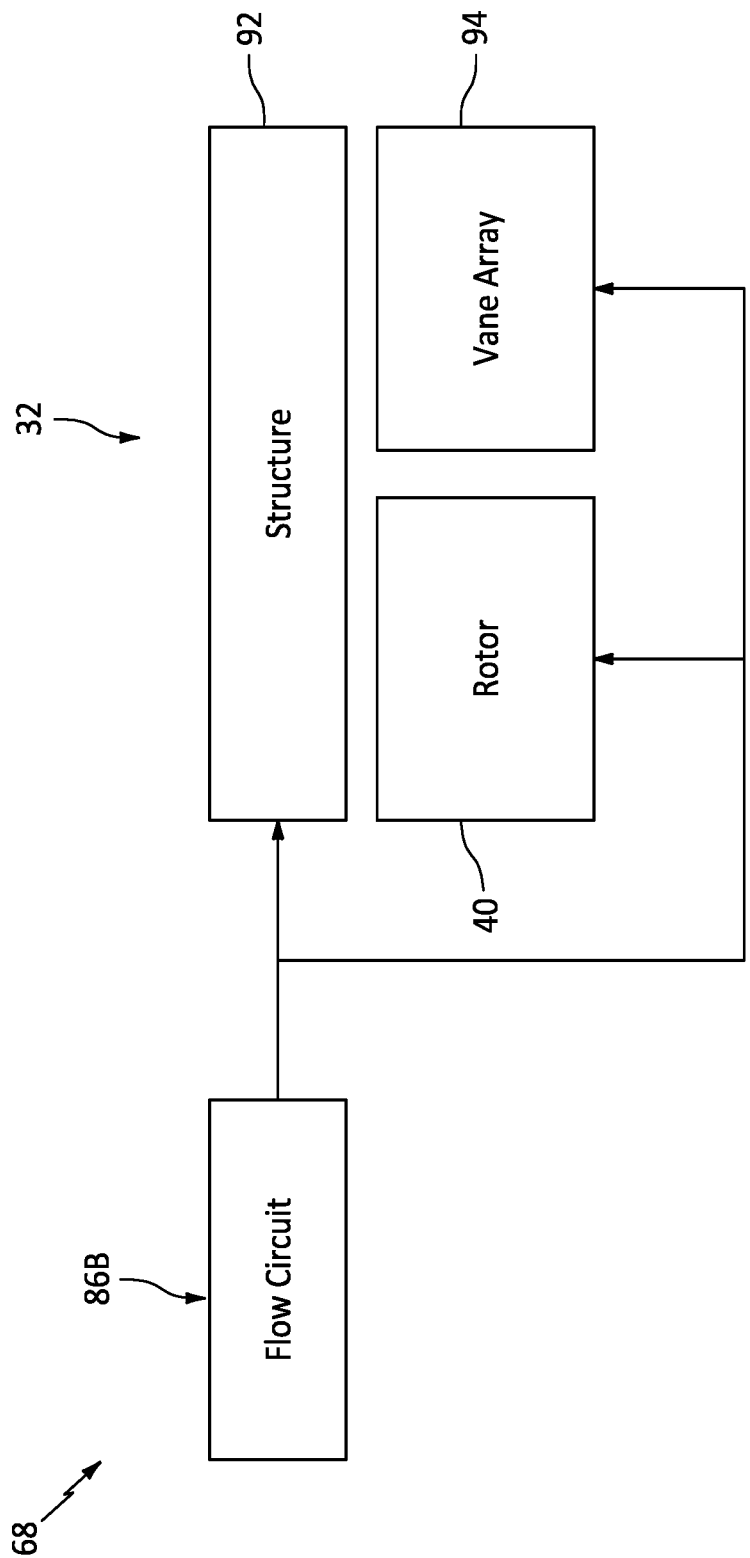
FIG. 3 is a schematic illustration of a water flow circuit servicing various components of a power turbine.

The flow circuit 86B is configured to direct (e.g., flow) the water vapor received from the evaporator 82 through the valve 84 to the turbine circuit inlet. At the power turbine 32, referring to FIG. 3, the water vapor may be used for cooling the power turbine rotor 40. The water vapor may also or alternatively be used for cooling a structure 92 circumscribing the power turbine rotor 40; e.g., a turbine case, a turbine blade outer air seal (BOAS), etc. The water vapor may also or alternatively be used for cooling one or more stator vane arrays 94 within the power turbine 32.

Referring to FIG. 2, the valve 84 is configured to selectively fluidly couple an upstream portion of the water processing system 72 (e.g., the evaporator 82) to one or more of the downstream flow circuits 86. The valve 84, for example, may open (or increase, un-restrict) flow to each of the flow circuits 86. The valve 84 may open (or increase, un-restrict) flow to the flow circuit 86A and close (or decrease, restrict) flow to the flow circuit 86B. The valve 84 may close (or decrease, restrict) flow to the flow circuit 86A and open (or increase, un-restrict) flow to the flow circuit 86B. The valve 84 may also or alternatively close (or decrease, restrict) flow to each of the flow circuits 86. With this arrangement, the valve 84 may be used for controlling cooling of the powerplant/engine components serviced by the flow circuits 86; in FIG. 2, the combustor 30 and the power turbine 32.

In some embodiments, the condenser 74 may be configured as or otherwise include a heat exchanger. In other embodiments, the condenser 74 may be configured as or otherwise include a condensing turbine.

Figure 4:
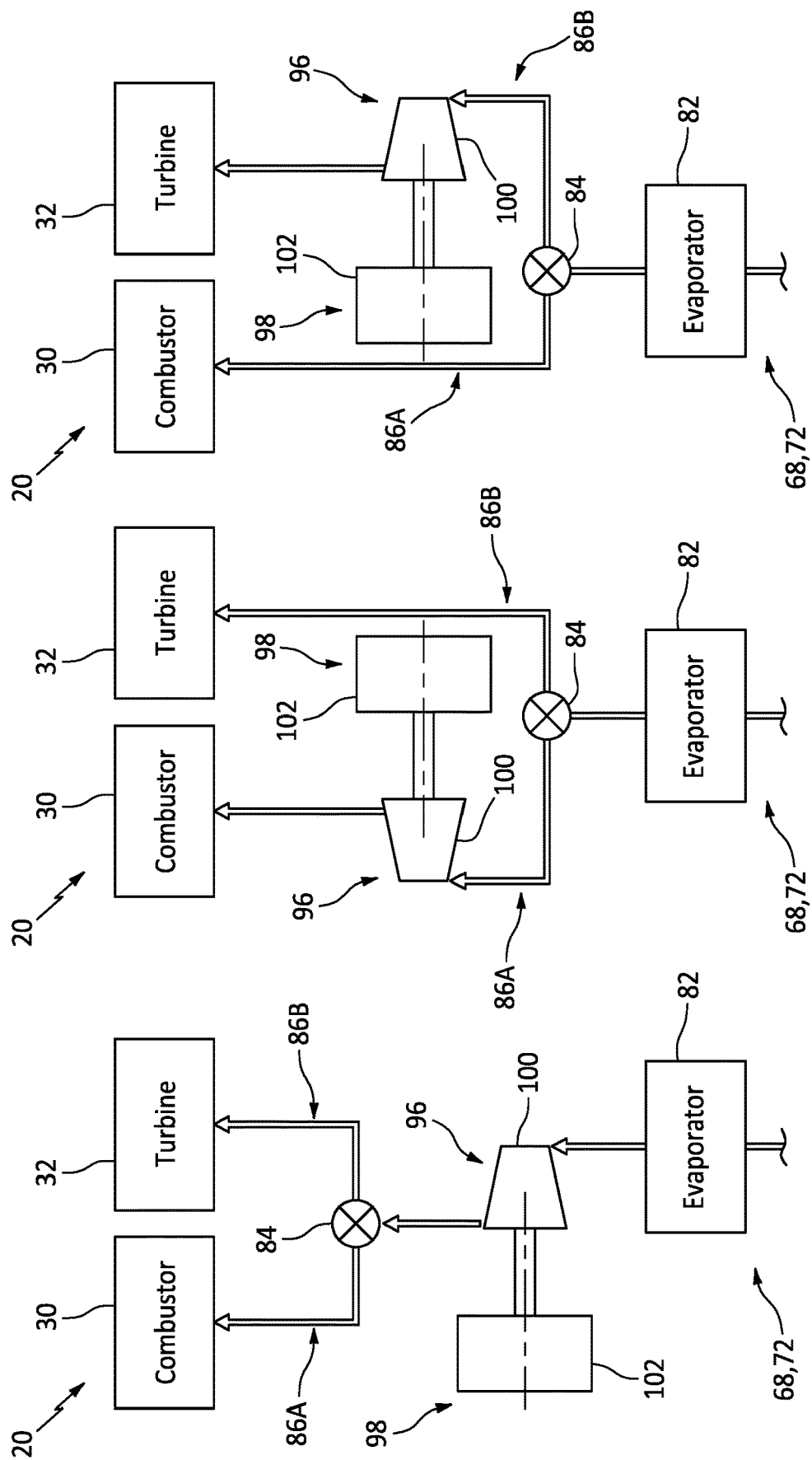
FIGS. 4A-C are schematic illustrations of a portion of the powerplant configured with a steam turbine in various arrangements.

In some embodiments, referring to FIGS. 4A-C, the powerplant 20 may include a steam turbine 96 fluidly coupled with the water recovery system 68. The steam turbine 96 of FIGS. 4A-C, for example, is fluidly coupled with and downstream of the evaporator 82. The steam turbine 96 of FIG. 4A is fluidly coupled with and upstream of the valve 84 and/or one or more of the flow circuits 86. The steam turbine 96 of FIG. 4B is included inline with the flow circuit 86A, and upstream of the combustor 30. The steam turbine 96 of FIG. 4C is included inline with the flow circuit 86B, and upstream of the power turbine 32. The steam turbine 96 of FIGS. 4A-C is configured to rotationally drive a mechanical load 98, which may be the same load as or a different load than the mechanical load 22 of FIG. 1. The steam turbine 96 of FIGS. 4A-C, for example, includes a steam turbine rotor 100 which is coupled to a driven rotor 102 of the mechanical load 98 through a drivetrain; e.g., a shaft. The water vapor (e.g., steam) output from the evaporator 82 flows through the steam turbine 96 causing the steam turbine rotor 100 to rotate. The rotation of the steam turbine rotor 100 drives rotation of the driven rotor 102. The driven rotor 102 may be configured as a propulsor rotor, a generator rotor, a pump rotor (e.g., for a turbopump) or any other type of rotor.

Figure 5:
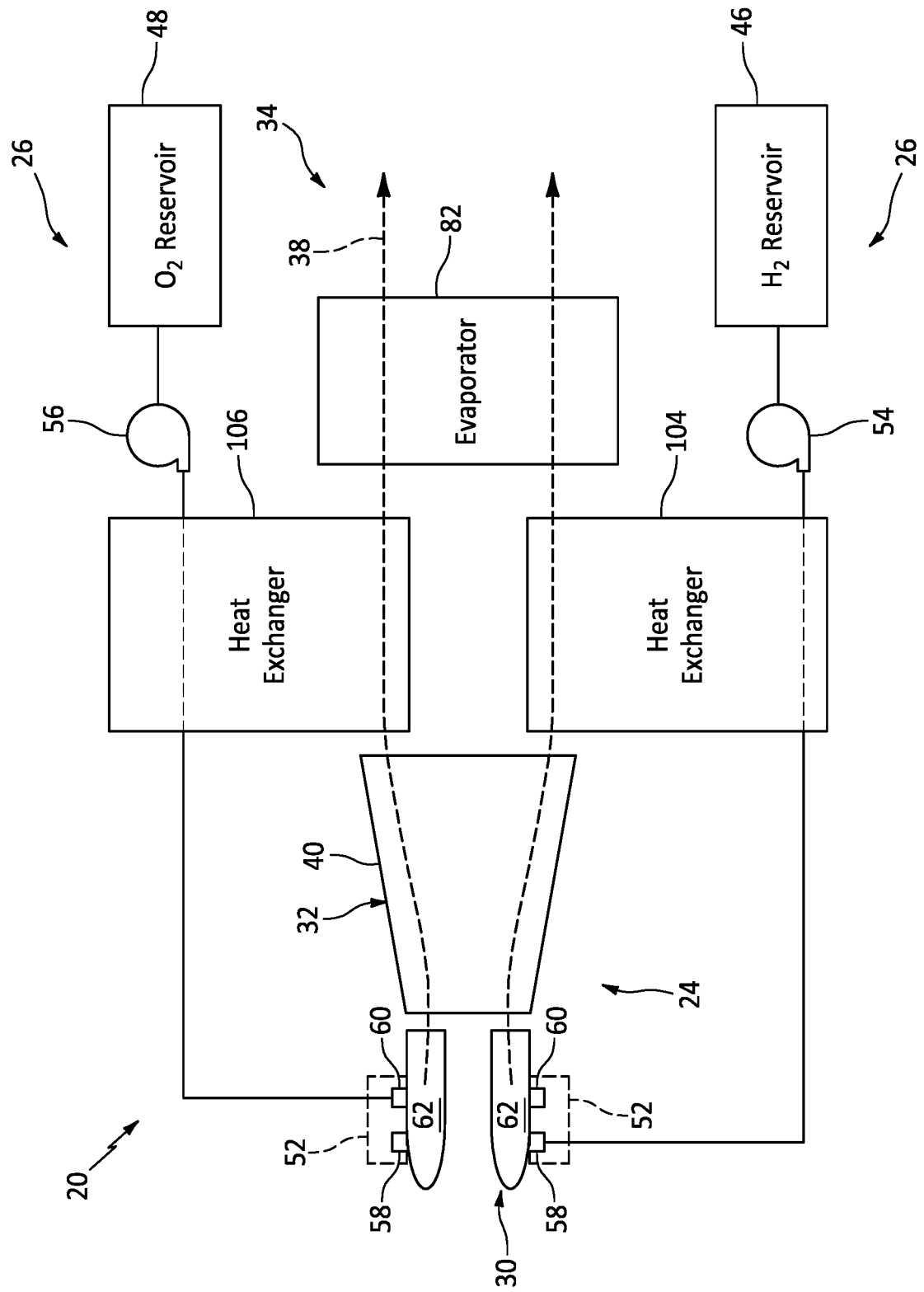
FIG. 5 is a schematic illustration of a portion of the powerplant engine system configured with a heated fluid delivery system.

In some embodiments, referring to FIG. 5, the fluid delivery system 26 may be configured with a heat exchange system; e.g., a recuperation system. The heat exchange system of FIG. 5 includes one or more heat exchangers 104 and 106; e.g., recuperators. Each of these heat exchangers 104, 106 is arranged with (e.g., within) the core flowpath 38 downstream of the combustor 30 and the power turbine 32; e.g., within the exhaust 34. Each of the heat exchangers 104, 106 of FIG. 5 is also arranged between the power turbine 32 and the evaporator 82 along the core flowpath 38.

The hydrogen heat exchanger 104 is fluidly coupled between the hydrogen reservoir 46 and the injection system 52 and its injectors 58. An inlet to a fluid hydrogen circuit of the hydrogen heat exchanger 104, for example, is fluidly coupled with the outlet from the hydrogen pump 54. An outlet from the fluid hydrogen circuit of the hydrogen heat exchanger 104 is fluidly coupled with the hydrogen inlet to the injection system 52.

The hydrogen heat exchanger 104 is configured to heat the fluid hydrogen being directed to the injection system 52 and its injectors 58. For example, as the fluid hydrogen received from the hydrogen pump 54 flows through the hydrogen heat exchanger 104, the hydrogen heat exchanger 104 may transfer heat energy from the relatively warm combustion products into the relatively cool fluid hydrogen; e.g., liquid hydrogen. This transfer of the heat energy heats the fluid hydrogen such that the injection system 52 and its injectors 58 receive the heated fluid hydrogen. This heating of the fluid hydrogen may prepare the fluid hydrogen for more efficient combustion with the fluid oxygen within the combustion chamber 62.

The oxygen heat exchanger 106 is fluidly coupled between the oxygen reservoir 48 and the injection system 52 and its injectors 60. An inlet to a fluid oxygen circuit of the oxygen heat exchanger 106, for example, is fluidly coupled with the outlet from the oxygen pump 56. An outlet from the fluid oxygen circuit of the oxygen heat exchanger 106 is fluidly coupled with the oxygen inlet to the injection system 52.

The oxygen heat exchanger 106 is configured to heat the fluid oxygen being directed to the injection system 52 and its injectors 60. For example, as the fluid oxygen received from the oxygen pump 56 flows through the oxygen heat exchanger 106, the oxygen heat exchanger 106 may transfer heat energy from the relatively warm combustion products into the relatively cool fluid oxygen; e.g., liquid oxygen. This transfer of the heat energy heats the fluid oxygen such that the injection system 52 and its injectors 60 receive the heated fluid oxygen. This heating of the fluid oxygen may prepare the fluid oxygen for more efficient combustion with the fluid hydrogen within the combustion chamber 62.

Figure 6:
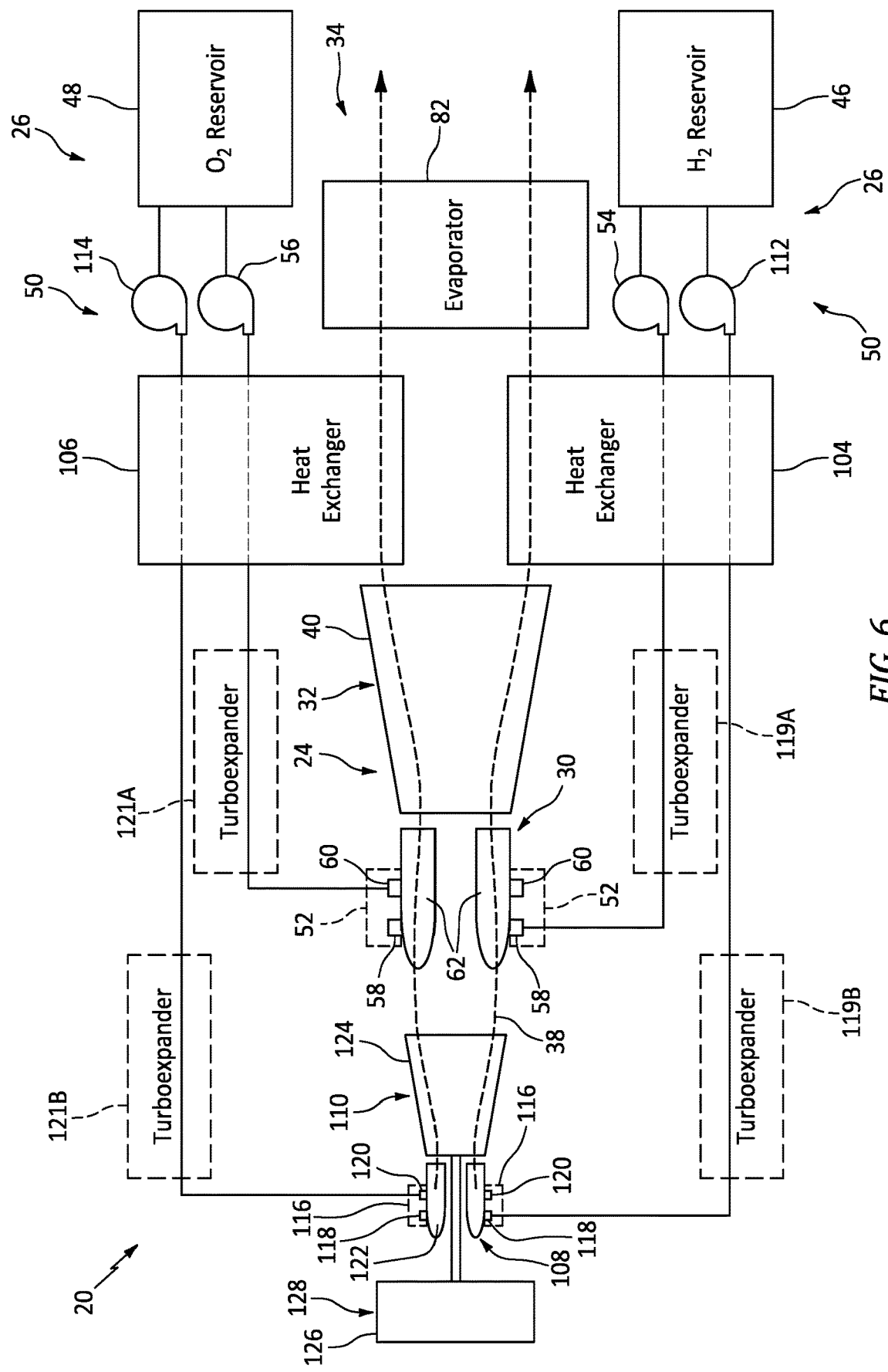
FIG. 6 is a schematic illustration of a portion of the powerplant engine system configured with the heated fluid delivery system and a pre-burner system.

In some embodiments, referring to FIG. 6, the powerplant 20 may also include a pre-burner 108 and another (e.g., upstream) turbine 110. The pre-burner 108 and the turbine 110 may be fluidly coupled with and upstream of the combustor 30 along the core flowpath 38. The core flowpath 38 of FIG. 6, for examples, may start at/within the pre-burner 108, and projects out of the pre-burner 108 and sequentially through the turbine 110, the combustor 30, the power turbine 32 and the exhaust 34. The core flowpath 38 thereby fluidly couples the turbine 110 with the pre-burner 108 and the combustor 30, where the turbine 110 is downstream of the pre-burner 108 along the core flowpath 38, and where the combustor 30 is downstream of the turbine 110 along the core flowpath 38.

The fluid delivery system 26 of FIG. 6 is also configured to provide the fluid hydrogen and the fluid oxygen to the pre-burner 108 for combustion. The pump system 50 of FIG. 6, for example, includes another fluid hydrogen pump 112 and another fluid oxygen pump 114.

The hydrogen pump 112 is fluidly coupled between the hydrogen reservoir 46 and the pre-burner 108 and, more particularly, an injection system 116 for the pre-burner 108. An inlet to the hydrogen pump 112, for example, is fluidly coupled with and downstream from the hydrogen reservoir outlet. An outlet from the hydrogen pump 112 is fluidly coupled with and upstream of a hydrogen inlet to the injection system 116. The hydrogen pump 112 is configured to draw the fluid hydrogen out of the hydrogen reservoir 46 through its hydrogen pump inlet, pressurize the fluid hydrogen within the hydrogen pump 112, and direct the pressurized fluid hydrogen to the pre-burner 108 via the injection system 116; e.g., through one or more fluid hydrogen injectors 118. The fluid hydrogen directed out of the hydrogen pump 112 may remain in the form of entirely (e.g., only) or substantially (e.g., at least 95%) liquid hydrogen, where this liquid hydrogen is provided to the fluid hydrogen injectors 118.

The hydrogen pump 112 may be configured to pressurize the fluid hydrogen to a different (e.g., higher or lower) pressure than the hydrogen pump 54. However, the hydrogen pump 112 may alternatively be configured to pressurize the fluid hydrogen to the same pressure as the hydrogen pump 54. Of course, in other embodiments, the hydrogen pumps 54 and 112 may be replaced by a single hydrogen pump that services both the combustor 30 and the pre-burner 108. Where the pumps 54 and 112 pressurize the fluid hydrogen to a common pressure (or where the hydrogen pumps 54 and 112 are replaced by a single hydrogen pump), a turboexpander 119A may be fluidly coupled in line between the pump 54 (or the common pump) and the injection system 52 and its injectors 58. The pre-burner 108 may thereby receive higher pressure fluid hydrogen than the combustor 30. Of course, in still other embodiments, another turboexpander 119B may also or alternatively be fluidly coupled in line between the pump (e.g., 112) and the injection system 116 and its injectors 118 to further tailor fluid hydrogen pressure to the injection system 116 and its injectors 118. Each turboexpander 119A, 119B is configured to expand the fluid hydrogen (e.g., hydrogen gas) flowing therethrough and/or generate mechanical power for rotating a mechanical load (not visible in FIG. 6), which mechanical load may be the same as or different than any of the other mechanical loads disclosed herein.

The oxygen pump 114 is fluidly coupled between the oxygen reservoir 48 and the pre-burner 108 and, more particularly, the injection system 116 for the pre-burner 108. An inlet to the oxygen pump 114, for example, is fluidly coupled with and downstream from the oxygen reservoir outlet. An outlet from the oxygen pump 114 is fluidly coupled with and upstream of an oxygen inlet to the injection system 116. The oxygen pump 114 is configured to draw the fluid oxygen out of the oxygen reservoir 48 through its oxygen pump inlet, pressurize the fluid oxygen within the oxygen pump 114, and direct the pressurized fluid oxygen to the pre-burner 108 via the injection system 116; e.g., through one or more fluid oxygen injectors 120. The fluid oxygen directed out of the oxygen pump 114 may remain in the form of entirely (e.g., only) or substantially (e.g., at least 95%) liquid oxygen, where this liquid oxygen is provided to the fluid oxygen injectors 120.

The oxygen pump 114 may be configured to pressurize the fluid oxygen to a different (e.g., higher or lower) pressure than the oxygen pump 56. However, the oxygen pump 114 may alternatively be configured to pressurize the fluid oxygen to the same pressure as the oxygen pump 56. Of course, in other embodiments, the oxygen pumps 56 and 114 may be replaced by a single oxygen pump that services both the combustor 30 and the pre-burner 108. Where the pumps 56 and 114 pressurize the fluid oxygen to a common pressure (or where the oxygen pumps 56 and 114 are replaced by a single oxygen pump), a turboexpander 121A may be fluidly coupled in line between the pump 56 (or the common pump) and the injection system 52 and its injectors 60. The pre-burner 108 may thereby receive higher pressure fluid oxygen than the combustor 30. Of course, in still other embodiments, another turboexpander 121B may also or alternatively be fluidly coupled in line between the pump (e.g., 114) and the injection system 116 and its injectors 120 to further tailor fluid oxygen pressure to the injection system 116 and its injectors 120. Each turboexpander 121A, 121B is configured to expand the fluid oxygen (e.g., oxygen gas) flowing therethrough and/or generate mechanical power for rotating a mechanical load (not visible in FIG. 6), which mechanical load may be the same as or different than any of the other mechanical loads disclosed herein.

During operation, the fluid delivery system 26 directs the fluid hydrogen and the fluid oxygen into the pre-burner 108 such that the fluid oxygen and the fluid hydrogen may mix to provide an oxygen rich (and hydrogen lean) fuel mixture within a combustion chamber 122 of the pre-burner 108. More particularly, a relatively high mass flow of the fluid oxygen may be injected into the combustion chamber 122, whereas a relatively low mass flow of the fluid hydrogen may be injected into the combustion chamber 122. The oxygen rich mixture may thereby (e.g., only) be partially combusted (e.g., reacted) within the combustion chamber 122 to provide combustion products of water ($H_2O$) vapor and oxygen ($O_2$) gas. In other words, the fluid oxygen ($O_2$) and the fluid hydrogen ($H_2$) may be metered into the combustion chamber 122 such that (e.g., only) a select percentage of the fluid oxygen reacts with substantially all or an entirety of the fluid hydrogen to form water ($H_2O$) vapor. The exact mixture ratio of hydrogen to oxygen in the pre-burner 108 may be selected such that the pre-burner 108 and/or the turbine 110 may be uncooled. The present disclosure, however, is not limited to such an uncooled configuration.

The combustion products from the combustion chamber 122 flow through the turbine 110 causing a turbine rotor 124 of the turbine 110 to rotate. The rotation of the turbine rotor 124 drives rotation of a driven rotor 126 of a mechanical load 128, which mechanical load 128 may be the same load as or a different load than the mechanical load 22 of FIG. 1. Briefly, the driven rotor 126 may be configured as a propulsor rotor, a generator rotor, a pump rotor (e.g., for a turbopump) or any other type of rotor. The combustion products are subsequently directed from the turbine 110 to the combustor 30, where leftover (e.g., unreacted) fluid oxygen within the combustion products from the pre-burner 108 may be combusted with the additional fluid oxygen provided by the injection system 52 and its injectors 60 within the combustion chamber 62.

The fluid delivery system 26 and/or the water recovery system 68 may be included with various turbine engines other than the one described above. The fluid delivery system 26 and/or the water recovery system 68, for example, may be included in a geared turbine engine where a gear train connects one or more shafts to one or more rotors. Alternatively, the fluid delivery system 26 and/or the water recovery system 68 may be included in a turbine engine configured without a gear train. The fluid delivery system 26 and/or the water recovery system 68 may be included in a geared or non-geared turbine engine configured with a single spool (e.g., see FIG. 1), with two spools, or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A powerplant, comprising:
an engine comprising an engine combustor, an engine turbine, a flowpath and a fluid delivery system, the flowpath extending out of the engine combustor and through the engine turbine, the fluid delivery system including a hydrogen reservoir and an oxygen reservoir, the hydrogen reservoir configured to store fluid hydrogen as liquid hydrogen, the oxygen reservoir configured to store fluid oxygen as liquid oxygen, and the fluid delivery system configured to provide the fluid hydrogen and the fluid oxygen for combustion within the engine combustor to produce combustion products within the flowpath;
a water recovery system configured to extract water from the combustion products, the water recovery system configured to provide the water to a component of the powerplant, and the water recovery system including a condenser and an evaporator;
the condenser arranged with the flowpath, the water recovery system configured to extract the water from the combustion products using the condenser, and the water extracted from the combustion products comprising liquid water;
the evaporator arranged with the flowpath, and the evaporator configured to vaporize at least some of the liquid water directed by the water recovery system towards the component into steam;
a steam turbine fluidly coupled between the evaporator and the component, the steam turbine including a steam turbine rotor configured to be rotatably driven by the steam; and
a heat exchanger system configured to transfer heat energy from the combustion products to at least one of the fluid hydrogen or the fluid oxygen, wherein the heat exchanger system is fluidly coupled along the flowpath between the engine turbine and the evaporator.

2. The powerplant of claim 1, wherein the engine combustor comprises the component.

3. The powerplant of claim 1, wherein the engine turbine comprises the component.

4. The powerplant of claim 1, wherein the water recovery system is configured to provide at least some of the water to the component as the steam.

5. The powerplant of claim 1, wherein the condenser comprises a condensing turbine.

6. The powerplant of claim 1, wherein the water recovery system further comprises a water pump fluidly coupled between the condenser and the evaporator.

7. The powerplant of claim 1, wherein the water recovery system comprises a water reservoir for storing at least some of the water.

8. The powerplant of claim 1, wherein
the heat exchanger system comprises a heat exchanger; and
the heat exchanger is configured to transfer the heat energy from the combustion products to the fluid hydrogen as the fluid delivery system directs the fluid hydrogen to the engine combustor.

9. The powerplant of claim 8, wherein
the fluid delivery system further includes a turboexpander downstream of the heat exchanger;
the heat exchanger is configured to vaporize the fluid hydrogen to provide gaseous hydrogen; and
the turboexpander is configured to expand the gaseous hydrogen and generate mechanical power.

10. The powerplant of claim 1, wherein
the heat exchanger system comprises a heat exchanger; and
the heat exchanger is configured to transfer the heat energy from the combustion products to the fluid oxygen as the fluid delivery system directs the fluid oxygen to the engine combustor.

11. The powerplant of claim 10, wherein
the fluid delivery system further includes a turboexpander downstream of the heat exchanger;
the heat exchanger is configured to vaporize the fluid oxygen to provide gaseous oxygen; and
the turboexpander is configured to expand the gaseous oxygen and generate mechanical power.

12. The powerplant of claim 1, further comprising:
a pre-burner arranged upstream of the engine combustor along the flowpath;
the fluid delivery system further configured to provide the fluid hydrogen and the fluid oxygen for combustion within the pre-burner.

13. The powerplant of claim 12, further comprising a second turbine arranged along the flowpath between the pre-burner and the engine combustor.

14. The powerplant of claim 1, further comprising a propulsor rotor coupled to and rotatably driven by the engine turbine.

15. The powerplant of claim 1, further comprising an electric generator comprising a generator rotor coupled to and rotatably driven by the engine turbine.

16. A powerplant, comprising:
an engine comprising an engine combustor, an engine turbine, a flowpath, a fluid delivery system and a water recovery system;
the flowpath extending out of the engine combustor and through the engine turbine;
the fluid delivery system including a hydrogen reservoir, an oxygen reservoir and a heat exchanger system, and the fluid delivery system configured to deliver fluid hydrogen and fluid oxygen for combustion within the engine combustor to produce combustion products within the flowpath;
the hydrogen reservoir configured to store the fluid hydrogen as liquid hydrogen;
the oxygen reservoir configured to store the fluid oxygen as liquid oxygen;
the heat exchanger system configured to transfer heat energy from the combustion products to at least one of the fluid hydrogen as the fluid delivery system directs the fluid hydrogen towards the engine combustor; or
the fluid oxygen as the fluid delivery system directs the fluid oxygen towards the engine combustor; and
the water recovery system including a condenser and an evaporator, the water recovery system configured to extract water from the combustion products using the condenser, and the water recovery system configured to provide the water to a component of the powerplant as steam using an evaporator, wherein the heat exchanger system is fluidly coupled along the flowpath between the engine turbine and the evaporator.

17. A method, comprising:
providing a powerplant for an aircraft, the powerplant including a mechanical load, an engine combustor, an engine turbine, a hydrogen reservoir, an oxygen reservoir, a water recovery system, an evaporator, a heat exchanger system and a flowpath, the flowpath extending out from the engine combustor and through the engine turbine and the evaporator, and the heat exchanger system fluidly coupled along the flowpath between the engine turbine and the evaporator;
directing fluid hydrogen from the hydrogen reservoir to the engine combustor, the fluid hydrogen stored within the hydrogen reservoir as liquid hydrogen;
directing fluid oxygen from the oxygen reservoir to the engine combustor, the fluid oxygen stored within the oxygen reservoir as liquid oxygen;
combusting the fluid hydrogen with the fluid oxygen within the engine combustor to provide combustion products;
directing the combustion products through the engine turbine to rotatably drive the mechanical load;
extracting water from the combustion products using the water recovery system;
evaporating the water to provide steam using the evaporator;
transferring heat energy from the combustion products to at least one of the fluid hydrogen or the fluid oxygen using the heat exchanger system;
driving a steam turbine rotor by directing the steam through a steam turbine that includes the steam turbine rotor; and
cooling a component of the powerplant using the steam output from the steam turbine.

\* \* \* \* \*